Aug. 3, 1948.  C. A. GERBER  2,446,175
APPARATUS FOR PREPARING DEHYDRATED BREAD CRUMBS
Filed Aug. 19, 1944
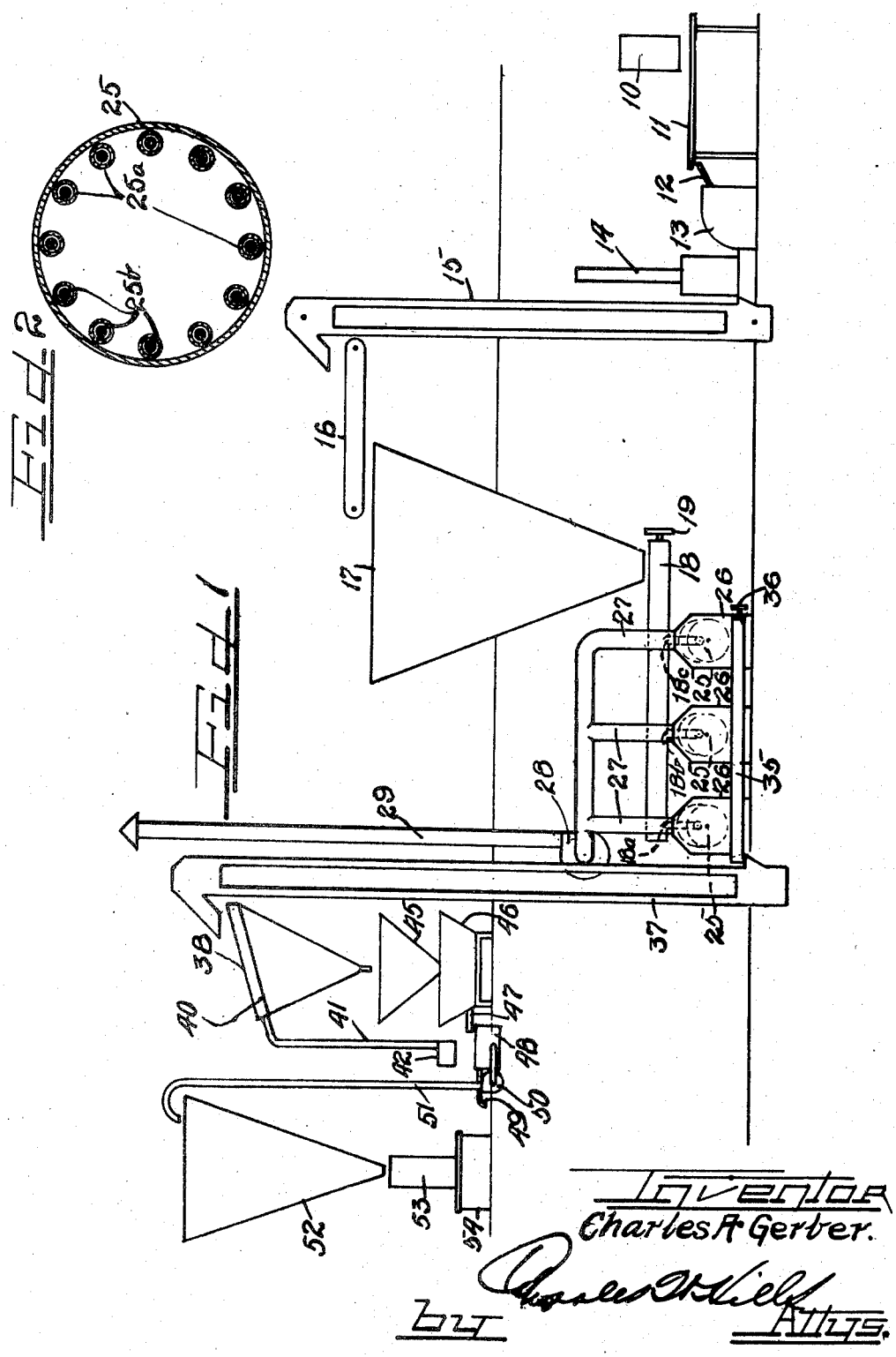
Inventor
Charles A. Gerber.

Patented Aug. 3, 1948

2,446,175

UNITED STATES PATENT OFFICE 2,446,175

APPARATUS FOR PREPARING DEHYDRATED BREAD CRUMBS

Charles A. Gerber, Wayne Township, Du Page County, Ill.

Application August 19, 1944, Serial No. 550,147

2 Claims. (Cl. 241—65)

This invention relates to means and apparatus for dehydrating bread. More particularly, the invention pertains to means for preparing from loaves of bread, such as ordinary white bread, dehydrated crumbs in the form of a coarse meal suitable for human consumption, for instance, in the preparation of breaded fried meat dishes, and also suitable for use in animal or poultry feed.

It is an important object of the present invention to provide means of the nature indicated capable of producing dehydrated bread crumbs having permanent keeping qualities.

Another important object of the present invention is to provide means of the nature indicated for preparing dehydrated bread crumbs and involving initial disintegrating means followed by intermediate dehydrating means and final comminuting step, the apparatus being of such nature and so correlated as to produce in great volume a tasty product with good keeping qualities with but little expense and consumption of labor.

Other and further objects and features of this invention will become apparent from the following description and appended claims, taken in conjunction with the accompanying drawing showing an example of apparatus according to the present invention. In this drawing:

Figure 1 is a diagrammatic representation of apparatus according to the present invention including a plurality of indirectly steam heated rotary driers; and Figure 2 is a greatly enlarged transverse cross-sectional view through one of said indirectly steam heated rotary driers.

The apparatus shown in Figure 1 is particularly adapted for handling wrapped loaves of white bread, which, when not disposed of by a retail bakery within twenty-four hours, become unsaleable. For handling such loaves, the apparatus of Figure 1 includes a slicing or cutting device 10 of any conventional type equipped with movable or stationary knives (not shown) capable of severing the wrapped loaves of bread into several parts so that the wrapping paper may be manually removed from the bread. The cut or sliced bread may be allowed to fall upon a table 11 for manual removal of the wrapping paper. After manual removal of wrapping paper, the cut or sliced loaf parts may be put onto an inclined board 12 and allowed to drop into a conventional hammer mill 13 devoid of fans or other means for blowing the air therethrough but provided with an air vent 14 for eliminating back pressure. In the hammer mill 13, the bread is disintegrated into particles of approximately pea size. It should be noted that this size represents the finest form into which the bread can be hammer milled without gumming or other adverse results, and that other disintegrating means than hammer mills cannot perform the desired disintegrating function at this stage of the process of the present invention.

The pea sized particles obtained by hammer milling are picked up by a vertical conveyor or lift 15, deposited on a horizontal conveyor 16 and by the latter dumped into a hopper 17. This hopper discharges into a conduit 18 provided with an interior screw conveyor (not shown) driven as by a pulley 19 for discharging the bread particles through three conduits 18a, 18b and 18c branching out from said conduit 18 into the upper ends of three tilted open-ended rotary drums 25. As shown in Figure 2, the tilted rotary drums may be of the conventional steam-tube drier type in which the drying cylinder is fitted with steam tubes 25a running the length of the drier along its inner surface. The steam drier illustrated is provided with double concentric pipes 25a and 25b. Steam is admitted through the inner pipe 25b which is open at one end to permit withdrawal of exhaust steam and/or condensed water through the interspace between the two pipes 25a and 25b.

Three rotary steam heated drums 25 are provided in parallel, and the conduit 18 with its branches 18a, 18b and 18c together with the screw conveyor (not shown) associated with the conduit 18 are so disposed and so regulated as to feed the pea sized particles into the rotary steam driers 25 at the same rate at which the material passes through the rotary steam driers 25.

In the steam driers 25, the bread particles are continuously tumbled and agitated due to the rotary movement of the cylindrical steam driers and the agitating effect of the steam pipes 25a, which rotate along with the cylindrical steam driers 25. Steam is admitted into the tubes 25b at a pressure of at least eighty-five pounds per square inch and preferably at least ninety pounds per square inch to provide indirectly heated surfaces having a temperature closely approximating that of the steam (at least 316° F. and preferably at least 321° F.). The heating surfaces should preferably not have temperatures in excess of 370° F. The rotary drums 25 are of such length and are so tilted that the material passes therethrough in from about four to ten minutes, preferably in about six minutes.

In the dehydration of bread according to the present invention, indirect rather than direct heating is essential since direct heating, as by a flame, will cause the absorption of foreign odors by the bread. A minimum temperature of the heating surface corresponding to that of steam at eighty-five pounds per inch pressure is indispensable, in order to reduce the moisture content of the bread at least to seven and preferably to five percent. If the dehydrated bread contains more than seven percent moisture, the bread will not keep, but will spoil fairly rapidly upon storage.

To effect dehydration of bread at least to the critical moisture content of seven percent or less, means must be provided for agitating and/or tumbling the bread in intimate contact with a rotating indirectly heated surface having the indicated temperature for a suitable period of time. Other means than those disclosed may be used, for instance, a plurality of surfaces heated indirectly by a hot gas or by a hot liquid medium, in combination with suitable agitating and/or conveying means, but the above described tilted rotary steam tube cylinders are preferred.

The rotary driers 25 may be enclosed within housings 26. Steam generated on drying escapes through the open ends of the driers 25 into the interior of the housings 26, from which the moisture is withdrawn through ducts 27 by the sucking action of a blower 28 and vented to the atmosphere through a conduit 29.

Whichever type of rotary drier is utilized, the dried material is discharged therefrom into a conduit 35 and moved therethrough by an internal screw conveyor (not shown) driven, for instance, by a pulley 36 into an elevator 37 for discharge into a hopper 38. The material discharged into the hopper 38 is put through a slanting screen 40 for removing agglomerated large moist particles formed by condensate occasionally dripping down the conduits 27 onto the dried bread. The screened-off particles are discharged through a conduit 41 and collected in a container 42. The separated still pea sized particles within the hopper 38 are discharged therefrom into another hopper 45 and thence lead into a Buhr mill 46 for grinding to a coarse meal having a particle size on the order of conventional cracker meal. It should be noted that this last grinding operation must be carried out by a Buhr mill, since altogether unsatisfactory results, such as the formation of an undue amount of dust-like particles, are obtained with other types of grinding apparatus.

From the Buhr mill 46, the coarse meal is taken through a conduit 47 into a sifter 48 where oversized or too coarse particles are removed and discharged through a conduit 49. A blower 50 blows the residual finer meal from the sifter into a conduit 51 for discharge into a hopper 52 adapted for storage and for filling containers such as a can 53 disposed on table 54.

It will thus be seen that I have provided means and apparatus for preparing dehydrated bread crumbs of good keeping qualities. The important features of the present invention include the use of a hammer mill for initial disintegration of loaves of bread to pea sized particles, the use of an indirectly steam heated rotary tubular drier equipped with suction means for removing generated steam in which drier the pea sized particles are tumbled at a minimum temperature of 316° F. until the moisture content has been reduced at least to seven and preferably to five percent and the use of a Buhr mill for comminuting the dried particles to the form of a coarse meal.

Many details of procedure and structure may be varied within a wide range without departing from the principles of this invention and it is therefore not my intention to limit the patent granted on this invention otherwise than necessitated by the scope of the appended claims.

I claim as my invention:

1. Apparatus for preparing dehydrated bread crumbs from loaves of bread which comprises means for slicing said loaves, a hammer mill for disintegrating the sliced loaves to approximately pea sized particle form, an enclosed inclined rotary kiln indirectly heated by internal steam coils defining a dehydrating zone for reducing the moisture content of said particles at least to seven percent, suction means for removing from the enclosure about said rotary kiln steam generated on drying of said particles, means for separating any agglomerated condensate-wetted particles from the dehydrated material, a Buhr mill for comminuting all the residual pea-sized dried material, means for separating oversized particles from the Buhr-milled material, and conveying means for transferring bread material from said hammer mill to said kiln, from said kiln to said first separating means, from said first separating means to said Buhr mill, and from said Buhr mill to said second separating means.

2. Apparatus for preparing dehydrated bread crumbs from loaves, which comprises a hammermill for disintegrating sliced loaves, an indirectly heated rotary kiln defining a dehydrating zone for reducing the moisture content of the disintegrated bread, means for removing from said kiln steam generated on drying of said bread, means for separating any agglomerated condensate-wetted bread particles from the dehydrated material, a Buhr mill for comminuting the residual dried bread material, means for separating oversized particles from the Buhr-milled material, and conveying means for transferring bread material from said hammermill to said kiln, from said kiln to said first separating means, from said first separating means to said Buhr mill, and from said Buhr mill to said second separating means.

CHARLES A. GERBER.

REFERENCES CITED

The following references are of record in the file of this patent:

UNITED STATES PATENTS

| Number | Name | Date |
| --- | --- | --- |
| 132,777 | Riech | Nov. 5, 1872 |
| 237,080 | Mercer | Jan. 25, 1881 |
| 307,633 | Dodson | Nov. 4, 1884 |
| 828,517 | Scoullar | Aug. 14, 1906 |
| 1,991,583 | Stockton | Feb. 19, 1935 |
| 1,996,177 | Stevenson | Apr. 2, 1935 |
| 2,042,979 | Anderson | June 2, 1936 |
| 2,066,621 | Gray | Jan. 5, 1937 |
| 2,088,810 | Quick | Aug. 3, 1937 |
| 2,347,215 | Patee | Apr. 25, 1944 |
| 2,350,935 | Sipe | June 6, 1944 |

FOREIGN PATENTS

| Number | Country | Date |
| --- | --- | --- |
| 333,778 | Great Britain | Aug. 21, 1930 |